(12) United States Patent
Tanaka

(10) Patent No.: US 9,533,750 B2
(45) Date of Patent: Jan. 3, 2017

(54) SLAT, WING OF AIRCRAFT, FLIGHT CONTROL SURFACE OF AIRCRAFT, AND AIRCRAFT

(75) Inventor: Hideaki Tanaka, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 333 days.

(21) Appl. No.: 14/126,291

(22) PCT Filed: Aug. 21, 2012

(86) PCT No.: PCT/JP2012/005228
§ 371 (c)(1),
(2), (4) Date: Dec. 13, 2013

(87) PCT Pub. No.: WO2013/027388
PCT Pub. Date: Feb. 28, 2013

(65) Prior Publication Data
US 2014/0166818 A1    Jun. 19, 2014

(30) Foreign Application Priority Data
Aug. 23, 2011   (JP) ................................. 2011-181500

(51) Int. Cl.
*B64C 3/18* (2006.01)
*B64C 9/22* (2006.01)
*B64C 3/50* (2006.01)

(52) U.S. Cl.
CPC ................. *B64C 3/18* (2013.01); *B64C 3/185* (2013.01); *B64C 3/187* (2013.01); *B64C 3/50* (2013.01); *B64C 9/22* (2013.01); *Y02T 50/44* (2013.01)

(58) Field of Classification Search
CPC ............ B64C 3/18; B64C 3/185; B64C 3/187; B64C 3/44; B64C 3/48; B64C 3/50; B64C 9/16; B64C 9/22
See application file for complete search history.

(56) References Cited

U.S. PATENT DOCUMENTS 4,739,954 A * 4/1988 Hamilton .................. B64C 3/26
244/123.1
6,010,098 A * 1/2000 Campanile ................ B64C 3/48
244/219
(Continued)

FOREIGN PATENT DOCUMENTS

GB          525400 A     8/1940
JP       2009-6987 A     1/2009

OTHER PUBLICATIONS

International Search Report for application No. PCT/JP2012/005228 dated Oct. 23, 2012.
(Continued)

*Primary Examiner* — Nicholas McFall
(74) *Attorney, Agent, or Firm* — Pearne & Gordon LLP

(57) ABSTRACT

A flight control surface such as a slat capable of keeping and achieving a minimum basic functions even when it is damaged by collisions of birds or the like, and a wing using the same are provided. Both ends of one wire cable 15 or more are fixed to paired ribs 10A and 10B provided in a short direction of the slat. This wire cable 15 is placed so as to pass through a through-hole 13 formed in each of the ribs 10 positioned between the paired ribs 10A and 10B. Even if birds or the like collide with slat 3 at the time of a flight of the aircraft to damage and deform not only a skin 4 of the slat 3 but also any rib 10, the wire cable 15 between the paired ribs 10A and 10B prevents the slat 3 from being broken into pieces.

12 Claims, 6 Drawing Sheets

(56) References Cited

U.S. PATENT DOCUMENTS

2010/0065687 A1* 3/2010 Douglas .................. B64C 3/185
                                                      244/130
2010/0084508 A1   4/2010 Hirai et al.

OTHER PUBLICATIONS

Maikuru C.Y Niu, "Airframe Structural Design" Kokuki Kozo Sekkei—Kitai Sekkei no Tameno Jitsuyosho, Yugen Kaisha Nagoya Koku Gijutsu, Feb. 12, 2000, pp. 343 to 344.

* cited by examiner

SLAT, WING OF AIRCRAFT, FLIGHT CONTROL SURFACE OF AIRCRAFT, AND AIRCRAFT

BACKGROUND OF THE INVENTION

Field of the Invention

The present invention relates to a slat provided to a main wing of an aircraft, an aircraft wing with the slat, and the like. In addition, the present invention relates to a flight control surface constituting a main wing or a tail unit of an aircraft, an aircraft wing with the same, and the like.

Description of the Related Art

As well known, in order to obtain high lift during takeoff and landing of an aircraft, a slat and a flap are added to a main wing (for example, refer to Japanese Patent Application, Publication No. 2009-006987 ([0002] in Specification)).

Here, since the slat is provided on a front side of the main wing, there is a possibility of damages on the slat particularly at the time of a low-altitude flight when birds, ices or the like collide with the slat. Needless to say, the slat is designed and manufactured so as to have a strength necessary for preventing such damages. However, if the strength of the slat is increased, the weight is increased accordingly. In practice, therefore, it is impractical to unduly increase the strength.

In addition, there is a possibility of damages on a flap, an aileron, a spoiler that constitute a main wing, as well as a rudder and an elevator that constitute a tail unit, when birds, ices or the like collide with them or by lightning. Also in these flight control surfaces, the strength and weight thereof are in a trade-off relationship.

The present invention was made in view of these technical problems, and has an object to provide a flight control surface such as a slat capable of keeping and achieving minimum basic functions even when it is damaged by collisions of birds or ices or by lightning, and to provide an aircraft wing and also an aircraft using the flight control surface.

SUMMARY OF THE INVENTION

For this purpose, the present invention is directed to a slat that is to be provided along a leading edge of a main wing of an aircraft, the slat including a skin of the slat, and a frame member provided in an inner space of the skin and serving as a skeletal frame of the skin. The frame member includes a plurality of ribs extending in a short direction of the slat and arranged so as to be spaced apart from each other in a longitudinal direction of the slat; a stiffener extending in the longitudinal direction of the slat to couple the plurality of ribs; and a coupling member that couples paired first ribs among the ribs; and wherein the coupling member is provided so as to pass through second ribs positioned between the paired first ribs.

Here, each of the second ribs includes a through-hole through which the coupling member passes.

Also, the paired first ribs each can include a rail member for enabling the slat to move close to and away from the leading edge of the main wing.

The coupling member is preferably wire-shaped or beam-shaped.

One example of the coupling member is a wire cable.

Furthermore, the present invention can provide a wing of an aircraft, specifically a main wing including the slat according to any of the aspects described above. An aircraft with the main wing is also provided.

The present invention can be applied to flight control surfaces other than a slat, such as a flap, an aileron, a spoiler, a rudder, and an elevator, all of which comprise a skin, ribs, and a stiffener. That is, the present invention also provides a flight control surface constituting a main wing or a tail unit of an aircraft. The flight control surface includes; a skin of the flight control surface; a plurality of ribs extending in a short direction of the flight control surface and arranged so as to be spaced apart from each other in a longitudinal direction of the flight control surface, the ribs being provided in an inner space of the skin; a stiffener extending in the longitudinal direction of the flight control surface to couple the plurality of ribs; and a coupling member that couples paired first ribs among the ribs. The flight control surface is characterized in that the coupling member is provided so as to pass through second ribs positioned between the paired first ribs.

According to the present invention, one or more coupling members are provided as being fixed to the paired first ribs provided to the flight control surface such as the slat. Thus, even if birds or the like collide with the flight control surface such as the slat at the time of a flight of the aircraft to damage and deform not only the skin of the flight control surface but also the frame member (stiffener, ribs), the paired ribs are coupled together with the coupling member and the coupling member is provided so as to pass through the second ribs positioned between the paired first ribs, thereby preventing the flight control surface such as the slat from being broken into pieces.

DETAILED DESCRIPTION OF THE PREFERRED EMBODIMENTS

The present invention is described in detail below based on an embodiment shown in the attached drawings.

Figure 1:
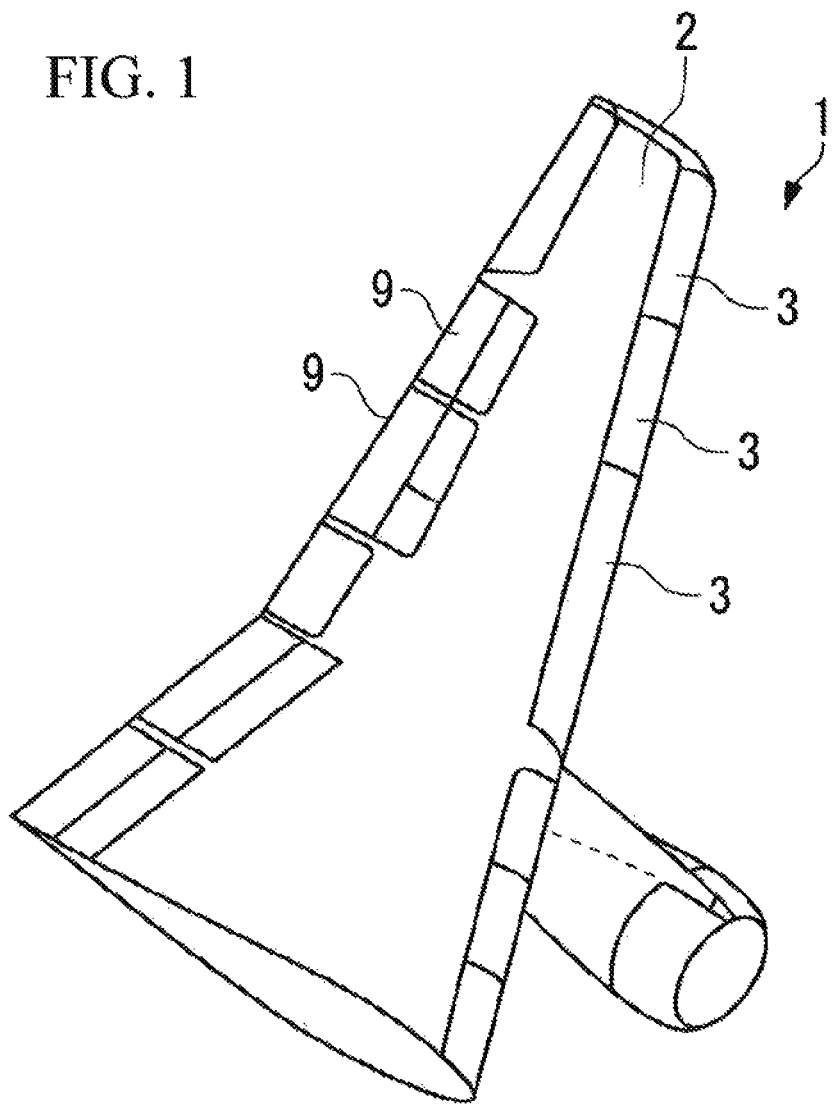
FIG. 1 is a perspective view of a wing according to an embodiment.

As shown in FIG. 1, an aircraft has a main wing (wing) 1 including a main wing body 2 and slats 3.

The slats 3 are arranged along a leading edge 2a of the main wing body 2. Inside and outside of the main wing body 2, a driving mechanism (not shown) for moving the slats 3 is provided.

In general, other high-lift generators such as flaps 9 are arranged on a trailing edge of the main wing body 2.

The main wing 1 usually comprises ailerons E and spoilers S. Moving up and down of the ailerons E enables an airframe of the aircraft to bank and thereby the aircraft turns. The operation of the spoilers S leads to an airframe bank or deceleration of the aircraft.

Figure 2A:
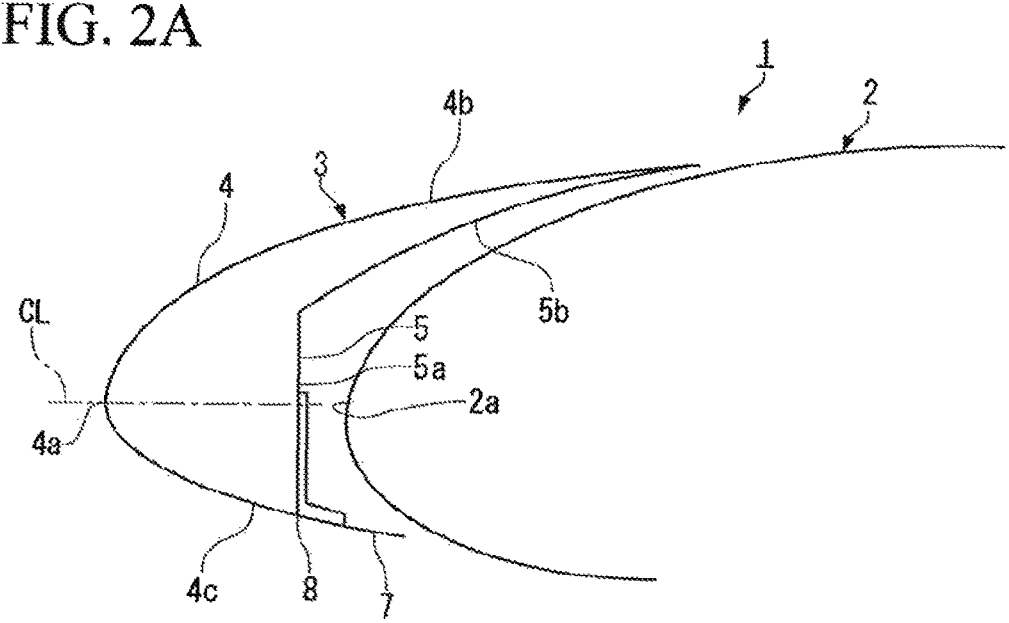
FIGS. 2A and 2B are sectional views each showing the operation of a slat provided to the wing.

When the aircraft with the main wing 1 is in a cruising state, as shown in FIG. 2A, the slat 3 moves close to the leading edge 2a of the main wing body 2. In this state, the main wing body 2 and the slat 3 almost integrally form the wing 1.

Figure 2B:
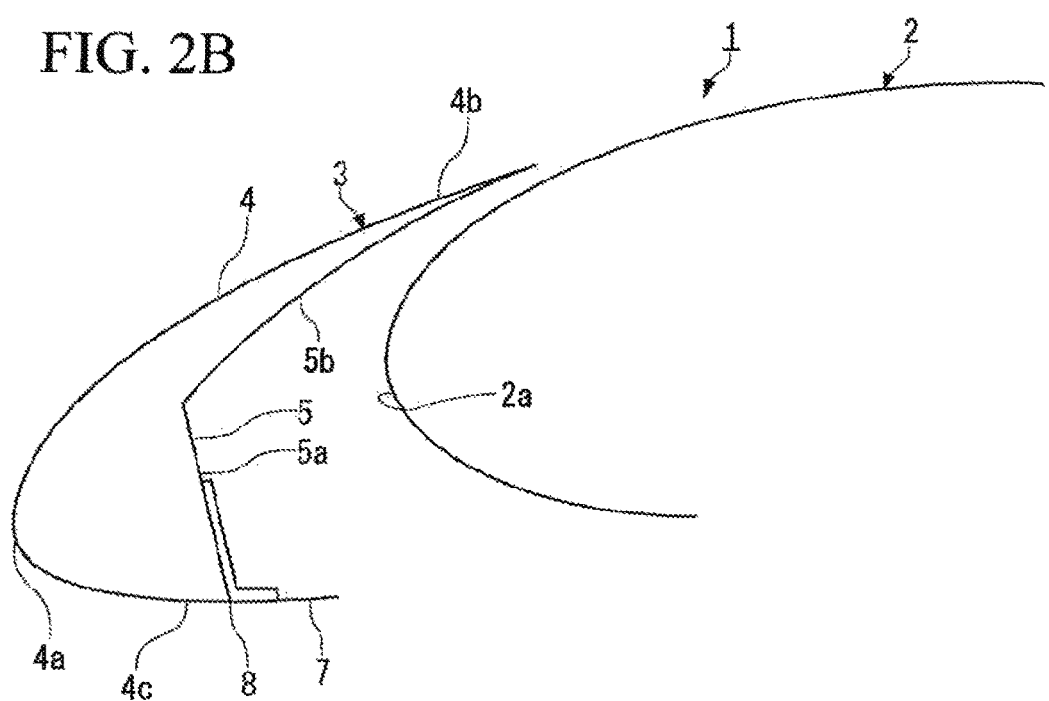

When the aircraft with the main wing 1 is ready for landing, in order to achieve aerodynamic characteristics necessary for landing, the slat 3 is deployed from the main wing body 2 as shown in FIG. 2B. Specifically, the slat 3 is deployed to increase a stall angle of the main wing 1, that is, in order not to stall to a large stall angle. When the slat 3 is deployed, the slat 3 falls down diagonally forward from the leading edge 2a of the main wing body 2, thereby forming a space between the main wing body 2 and the slat 3. Note that the degree of deploying the slat 3 differs between takeoff and landing and the slat 3 may be more deployed at the time of landing than takeoff.

Such the slat 3 has an outer shell formed of a skin 4 and a cove (a concave part) 5.

The skin 4 has an upper surface 4b and a lower surface 4c along which an airflow flows, these surfaces being continuous from a front edge 4a, which is an upstream side end of an airflow. The upper surface 4b is a surface smoothly connected from the leading edge 4a, and is formed so as to protrude and extend to a main wing body 2 side than the lower surface 4c. The lower surface 4c forms a surface smoothly connected from the front edge 4a, and has a lower surface plate 7 integrally formed at an end on a downstream side so as to protrude toward the downstream side.

The cove 5 is a concave part formed in a region facing the main wing body 2 in the slat 3. The leading edge 2a of the main wing body 2 is accommodated in the cove 5 when the slat 3 is positioned close to the leading edge 2a of the main wing body 2. The cove 5 has a surface 5a orthogonal to a center axis line CL and a facing surface 5b that faces the upper surface of the main wing body 2 and gradually approaches the upper surface 4b of the skin 4. Note that the cove 5 is not particularly restricted to have the structure described above, and may be configured of one curved surface.

A lower surface plate 7 is a plate-like member extending from a ridgeline part 8 where the lower surface 4c and the cove 5 cross toward the main wing body 2, and is integrally formed with the skin 4 in a fixed state so as to be continuous to the lower surface 4c. This lower surface plate 7 is formed by using, for example, an aluminum alloy, CFRP (carbon fiber reinforced plastic), GFRP (glass fiber reinforced plastic), stainless steel, or the like.

Figure 3:
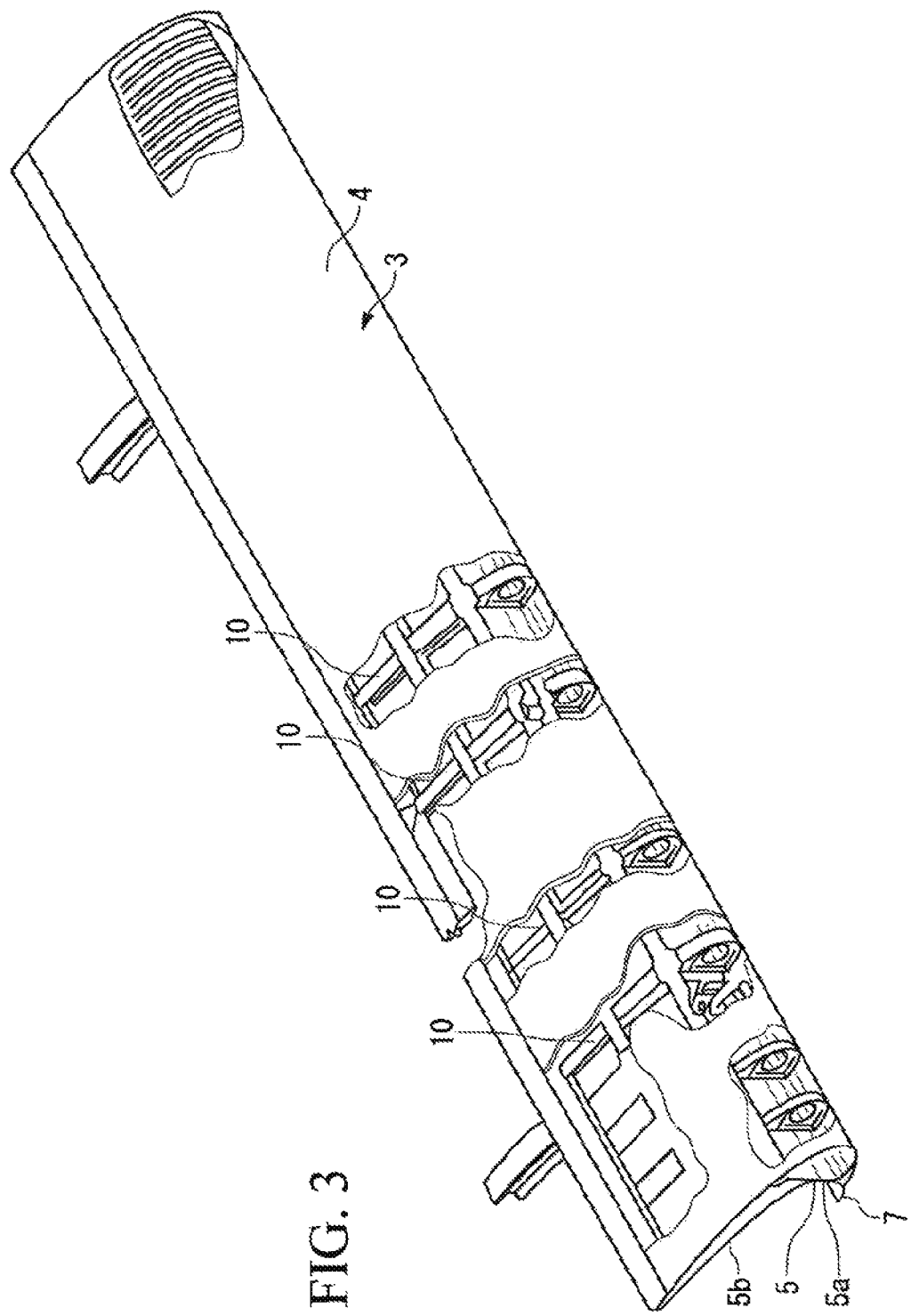
FIG. 3 is a partial sectional perspective view of a slat provided to the wing.
Figure 5:
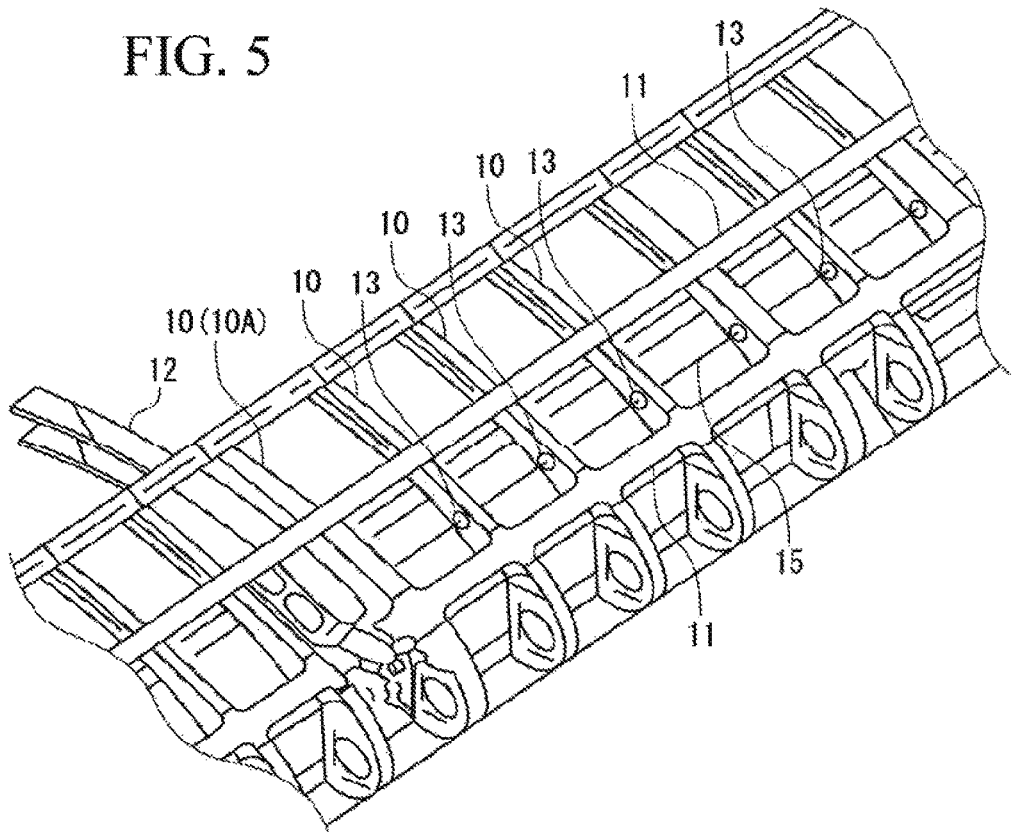
FIG. 5 is a partially enlarged view of the frame member.

As shown in FIGS. 3 and 5, this slat 3 has the outer shell formed of the skin 4 and the cove 5. In an inner space of the slat 3, as a frame member forming a skeletal frame, a plurality of ribs 10 arranged so as to be spaced apart from each other in a spanwise direction of the wing 1 (longitudinal direction of the slat) and stiffeners 11 coupling the plurality of ribs 10 together and extending in the spanwise direction of the wing 1 (longitudinal direction of the slat) are provided.

Figure 4:
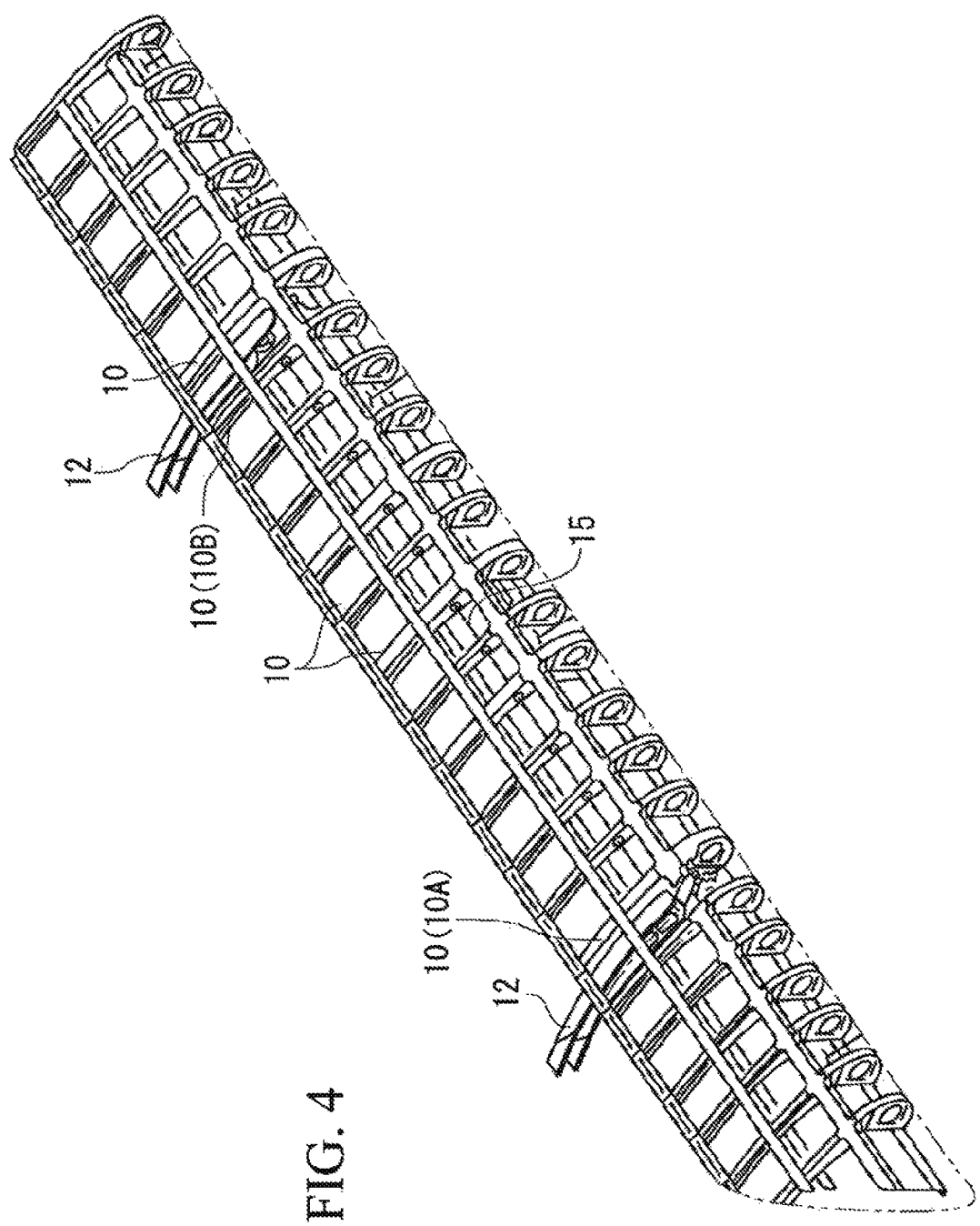
FIG. 4 is a perspective view of a frame member of the slat.

As shown in FIG. 4, a rail member 12 extending to a main wing body 2 side is provided to each of paired ribs (first ribs) 10A and 10B among ribs 10. The paired ribs 10A and 10B are preferably provided near both ends of the slat 3. This rail member 12 is provided with a rack gear(s) not shown, and the main wing body 2 comprises pinion gear(s) engaging with this rack gear(s) and a motor rotating the pinion gear(s). The motor rotates and drives the pinion gear(s), and thereby the slat 3 is driven to go forward and backward together with the rail member 12 toward the front and rear in a flight direction of an airframe.

Each rib 10 has a through-hole 13 formed therein for the purpose of light weight, insertion of various wirings and pipes, and others.

As shown in FIG. 4 and FIG. 5, both ends of one wire cable (a coupling member) 15 or more are fixed to the ribs 10A and 10B in the present embodiment. This wire cable 15 is placed so as to pass through the through-hole 13 formed in each of the ribs 10 (second ribs) positioned between the ribs 10A and 10B.

Figure 6:
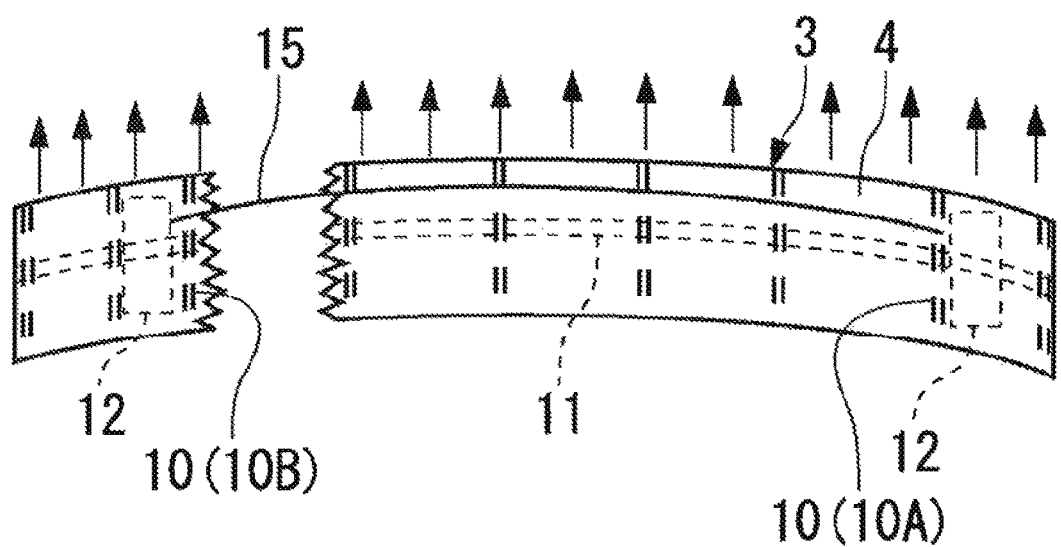
FIG. 6 is a drawing showing an example in which the slat is broken.

With this wire cable 15, even if birds or the like collide with the slat 3 at the time of a flight of the aircraft to damage and deform not only the skin 4 but also any rib 10 to cut the stiffeners 11 positioned between the ribs 10A and 10B and further rupture the skin 4 and the cove 5 as shown in FIG. 6, the ribs 10A and 10B are coupled together with the wire cable 15 and the wire cable 15 further passes through the other ribs 10 positioned between these ribs 10A and 10B. Therefore, the ribs 10 between the ribs 10A and 10B are bound together within a range of the through-hole 13 to prevent the slat 3 from being broken into pieces. Also, since the ribs 10A and 10B are coupled to the main wing body 2 via the rail members 12, the slat 3 can be prevented from being ripped from the main wing body 2 to fly off.

As a result, although the slat 3 may be deformed, the slat 3 can keep and achieve a minimum basic functions in even a small aircraft.

Note that while the structure of the slat 3 has been described in the present embodiment, the shape of the skin 4 and the cove, the number, shape, and position of the ribs 10 and the stiffeners 11, and others are not restrictive. In addition, although the wire cable 15 is positioned only between the rail members 12 in FIG. 4, the wire cable 15 may be extended to near the both ends of the slat 3.

Furthermore, in place of the wire cable 15, a steel beam member or the like may be used. Still further, the wire cable 15 may be provided on a front side, a rear side, or an intermediate portion of the ribs 10 in the flight direction, and the number of wire cables 15 is also not restrictive.

In the present embodiment, the slat 3 is exemplified in order to explain the effects of the present invention, however, the present invention can be applied to flight control surfaces other than the slat 3, which comprise a skin, ribs, and stiffeners. For example, when a coupling member such as the above-mentioned wire cable 15 is provided on the flap 9, aileron E, and spoiler S that constitutes the main wing in a similar manner, the same effect can be obtained as in the case of slat 3. An elevator constituting a horizontal tail and a rudder constituting a vertical tail are also flight control surfaces that comprise a skin, ribs, and stiffeners. Likewise, a coupling member such as the above-mentioned wire cable 15 may be provided on the elevator and the rudder.

In addition, any structure can be selected and the structure described in the present embodiment can be modified to another structure as appropriate as long as such selection and modification does not deviate from the gist of the present invention.

REFERENCE SIGNS LIST

1 Main wing
2 Main wing body
3 Slat (flight control surface)
4 Skin
5 Cove
9 Flap (flight control surface)
10 Rib
11 Stiffener 12 Rail member
13 Through-hole
15 Wire cable (coupling member)
E Aileron (flight control surface)
S Spoiler (flight control surface)

What is claimed is:

1. A slat that is to be provided along a leading edge of a main wing of an aircraft,
the slat comprising:
   a skin of the slat; and
   a frame member provided in an inner space of the skin and serving as a skeletal frame of the skin,
   the frame member including
   a plurality of ribs extending in a short direction of the slat and arranged so as to be spaced apart from each other in a longitudinal direction of the slat,
   a stiffener extending in the longitudinal direction of the slat to couple the plurality of ribs, and
   a coupling member that couples paired first ribs among the ribs; and wherein
   the coupling member is provided so as to pass through a through-hole in a second rib positioned between the paired first ribs, wherein the coupling member is not fixed to the second rib, the through-hole being a hole that is bounded about its perimeter by the second rib.

2. The slat according to claim 1, wherein the slat comprises a plurality of second ribs and a plurality of through-holes through which the coupling member passes, each of the plurality of through-holes being a hole that is bounded about its perimeter by a corresponding one of the plurality of second ribs.

3. The slat according to claim 1, wherein the paired first ribs each include a rail member for enabling the slat to move close to and away from the leading edge of the main wing.

4. The slat according to claim 1, wherein the coupling member is wire-shaped or beam-shaped.

5. The slat according to claim 1, wherein the coupling member is a wire cable.

6. A wing of an aircraft including the slat according to claim 1.

7. An aircraft including the wing according to claim 6.

8. A flight control surface constituting a main wing or a tail unit of an aircraft,
the flight control surface comprising:
   a skin of the flight control surface;
   a plurality of ribs extending in a short direction of the flight control surface and arranged so as to be spaced apart from each other in a longitudinal direction of the flight control surface, the ribs being provided in an inner space of the skin;
   a stiffener extending in the longitudinal direction of the flight control surface to couple the plurality of ribs; and
   a coupling member that couples paired first ribs among the ribs, and wherein
   the coupling member is provided so as to pass through a through-hole in a second rib positioned between the paired first ribs, wherein the coupling member is not fixed to the second rib, the through-hole being a hole that is bounded about its perimeter by the second rib.

9. The flight control surface according to claim 8, wherein the flight control surface is one of a flap, an aileron, and a spoiler that constitute the main wing.

10. The flight control surface according to claim 8, wherein the flight control surface is one of a rudder and an elevator that constitute the tail unit.

11. An aircraft including the flight control surface according to claim 8.

12. The flight control surface according to claim 8, wherein the flight control surface comprises a plurality of second ribs and a plurality of through-holes through which the coupling member passes, each of the plurality of through-holes being a hole that is bounded about its perimeter by a corresponding one of the plurality of second ribs.

* * * * *